United States Patent
Joshi

(10) Patent No.: US 7,760,765 B2
(45) Date of Patent: Jul. 20, 2010

(54) SYSTEM AND METHOD FOR THE REACQUISITION OF A GATED PILOT

(75) Inventor: Abhay Arvind Joshi, San Diego, CA (US)

(73) Assignee: Qualcomm, Incorporated, San Diego, CA (US)

( * ) Notice: Subject to any disclaimer, the term of this patent is extended or adjusted under 35 U.S.C. 154(b) by 1698 days.

(21) Appl. No.: 10/448,818

(22) Filed: May 31, 2003

(65) Prior Publication Data

US 2004/0240476 A1 Dec. 2, 2004

(51) Int. Cl.
*H04B 3/10* (2006.01)
(52) U.S. Cl. .................. 370/491; 370/500; 370/520
(58) Field of Classification Search .............. 370/500
See application file for complete search history.

(56) References Cited

U.S. PATENT DOCUMENTS

| 6,101,173 | A  | * | 8/2000  | Bayley .................... 370/311 |
| 6,212,398 | B1 | * | 4/2001  | Roberts et al. ............ 455/502 |
| 6,249,539 | B1 | * | 6/2001  | Harms et al. .............. 375/130 |
| 6,718,171 | B1 | * | 4/2004  | Hunzinger ................. 455/450 |
| 7,031,271 | B1 | * | 4/2006  | LaRosa et al. ............. 370/311 |
| 2002/0061050 | A1 | * | 5/2002 | Ozluturk et al. ........... 375/141 |
| 2003/0007468 | A1 | * | 1/2003 | Joshi et al. ................ 370/335 |
| 2003/0031144 | A1 |   | 2/2003 | Joshi et al. |
| 2003/0040315 | A1 | * | 2/2003 | Khaleghi et al. ........... 455/435 |
| 2003/0193914 | A1 | * | 10/2003 | Lomp et al. ................ 370/335 |
| 2003/0223396 | A1 | * | 12/2003 | Tsai et al. .................. 370/342 |
| 2004/0176147 | A1 | * | 9/2004 | Escalante ................... 455/574 |

* cited by examiner

*Primary Examiner*—Jayanti K Patel
*Assistant Examiner*—Bo Hui A Zhu
(74) *Attorney, Agent, or Firm*—Larry Moskowitz

(57) ABSTRACT

Systems and techniques are disclosed wherein a gated pilot signal can be re-acquired faster by searching a last known pilot offset and/or searching a last coset in which the last pilot signal was found.

21 Claims, 5 Drawing Sheets

SYSTEM AND METHOD FOR THE REACQUISITION OF A GATED PILOT

BACKGROUND

1. Field

The present disclosure relates generally to communications systems, and more specifically, to systems and techniques for the reacquisition of a gated pilot signal.

2. Background

Modern communications systems are designed to allow multiple users to share a common communications medium. One such communications system is a code division multiple access (CDMA) system. The CDMA communications system is a modulation and multiple access scheme based on spread-spectrum communications. In a CDMA communications system, a large number of signals share the same frequency spectrum and, as a result, provide an increase in user capacity. This is achieved by transmitting each signal with a different pseudo-noise (PN) code that modulates a carrier, and thereby, spreads the spectrum of the signal waveform. The transmitted signals are separated in the receiver by a correlator that uses a corresponding PN code to despread the desired signal's spectrum. The undesired signals, whose PN codes do not match, are not despread in bandwidth and contribute only to noise.

In a CDMA communications system, a subscriber station may access a network, or communicate with other subscriber stations, through one or more base stations. Each base station is configured to serve all subscriber stations in a specific geographic region generally referred to as a cell. In some high traffic applications, the cell may be divided into sectors with a base station serving each sector. Each base station transmits a continuous pilot signal which is used by the subscriber stations for synchronizing with a base station and to provide coherent demodulation of the transmitted signal once the subscriber station is synchronized to the base station. The subscriber station generally establishes a communications channel with the base station having the strongest pilot signal.

Since a continuous pilot signal requires bandwidth that could otherwise be used to transmit information, some recently developed CDMA communications systems, such as IS-856, have employed gated pilot signals. A gated pilot signal is characterized by a short period of transmission of pilot signal followed by a long period of no transmission. By gating the pilot signal, additional bandwidth can be realized which increases the capacity of the base station. However, acquisition of gated pilot signal takes a longer time than acquisition of a continuous pilot signal. If the mobile performs frequent re-acquisitions, long delays wasted for re-acquisition can deteriorate the quality of data service offered by the subscriber stations. Thus, what is needed is a system and method to reduce the time it takes to re-acquire a gated pilot signal after it has been lost.

It would be apparent to those skilled in the art that any communications system and method that uses a gated pilot signal can benefit from a system and method to reduce the time it takes to re-acquire the gated pilot signal.

Systems and techniques for acquisition of a gated pilot are described in U.S. Patent Application Number, "Acquisition of a Gated Pilot," Ser. No. 09/927,869, filed Aug. 9, 2001. Systems and techniques for acquisition of a gated pilot are disclosed wherein a gated pilot signal can be acquired by searching for a first gated pilot signal, deriving timing information from the search for the first gated pilot signal, and searching for a second gated pilot signal using the timing information.

Systems and techniques for acquisition of a gated pilot by avoiding partial correlation peaks are described in U.S. Patent Application Number, "Acquisition of a Gated Pilot By Avoiding Partial Correlation Peaks," Ser. No. 09/895,657, filed Jun. 29, 2001. Systems and techniques are disclosed wherein a gated pilot signal can be acquired faster by checking the neighbor pilot signals of the target pilot signal.

SUMMARY

In an aspect of the present invention, a system and method of re-acquiring a gated pilot signal includes determining the gated pilot signal is lost and searching a last known pilot offset.

In an aspect of the present invention, a system and method of re-acquiring a gated pilot signal includes determining the gated pilot signal is lost and searching a last coset in which the last pilot signal was found.

In another aspect of the present invention, a receiver, comprises a searcher configured to search for a plurality of pilot signals and a processor coupled to the searcher and configured to select a pilot signal corresponding to the last known pilot offset. In an aspect of the present invention, a receiver, comprises a searcher configured to search for a plurality of pilot signals and a processor coupled to the searcher and configured to select a pilot signal from a last coset in which the last pilot signal was found.

In yet another aspect of the present invention, a computer-readable medium embodying a program of instructions executable by a computer to perform a method of acquiring a gated pilot signal, the method comprising determining the gated pilot signal is lost and searching a last known pilot offset. In an aspect of the present invention, a computer-readable medium embodying a program of instructions executable by a computer to perform a method of acquiring a gated pilot signal, the method comprising determining the gated pilot signal is lost and searching a last coset in which the last pilot signal was found.

It is understood that other embodiments of the present invention will become readily apparent to those skilled in the art from the following detailed description, wherein it is shown and described only exemplary embodiments of the invention by way of illustration. As will be realized, the invention is capable of other and different embodiments and its several details are capable of modification in various other respects, all without departing from the spirit and scope of the present invention. Accordingly, the drawings and detailed description are to be regarded as illustrative in nature and not as restrictive.

BRIEF DESCRIPTION OF THE DRAWINGS

Aspects of the present invention are illustrated by way of example, and not by way of limitation, in the accompanying drawings where.

DETAILED DESCRIPTION

The detailed description set forth below in connection with the appended drawings is intended as a description of exemplary embodiments of the present invention and is not intended to represent the only embodiments in which the present invention can be practiced. In some instances, the detailed description includes specific details for the purpose of providing a thorough understanding of the present invention. However, it will be apparent to those skilled in the art that the present invention may be practiced without these specific details. In other instances, well known structures and devices are shown in block diagram form in order to avoid obscuring the concepts of the present invention.

A subscriber station (also called subscriber unit, mobile station, mobile, remote station, remote terminal, access terminal, and user equipment), may be mobile or stationary, and may communicate with one or more base stations (BSs) (also called base transceiver systems (BTSs), base station transceivers, access points, access nodes, Node B, and modem pool transceivers (MPTs)).

Figure 1:
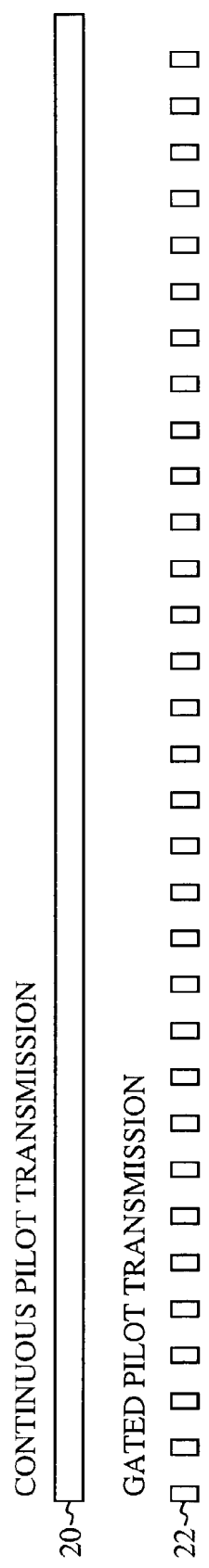
FIG. 1 shows an exemplary continuous pilot transmission and a gated pilot transmission.

FIG. 1 shows an exemplary continuous pilot transmission 20 and a gated pilot transmission 22. The gated pilot signal includes a period of transmitting a pilot signal, followed by a period of not transmitting a pilot signal. Gating the pilot signal enables an increase in bandwidth because the period of not transmitting a pilot signal can be used to transmit data rather than transmitting the pilot signal.

Figure 2:
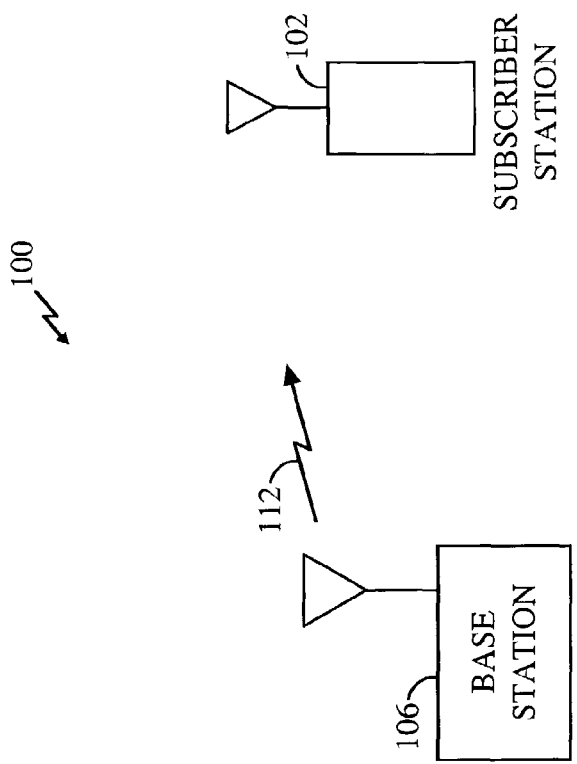
FIG. 2 is a system diagram of an exemplary communications system.
Figure 2:
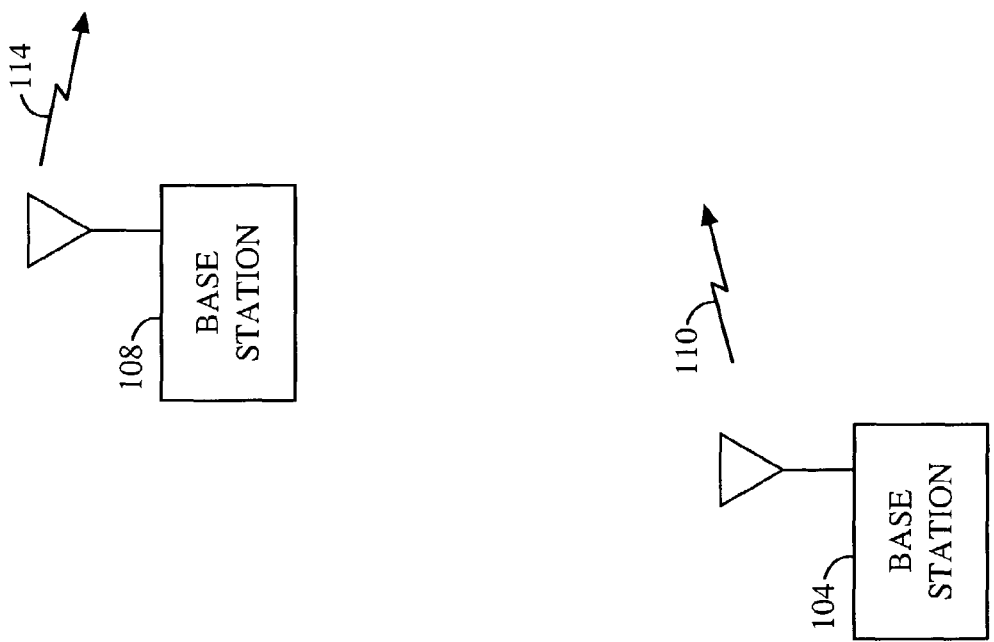

FIG. 2 is a system diagram of an exemplary communications system 100. Communications system 100 may be designed to support one or more CDMA standards such as (1) the "TIA/EIA-95-B Mobile Station-Base Station Compatibility Standard for Dual-Mode Wideband Spread Spectrum Cellular System" (the IS-95 standard), (2) the "TIA/EIA/IS-856 cdma2000 High Rate Packet Data Air Interface Specification" (hereinafter IS-856), (3) the documents offered by a consortium named "3rd Generation Partnership Project" (3GPP) and embodied in a set of documents including Document Nos. 3G TS 25.211, 3G TS 25.212, 3G TS 25.213, and 3G TS 25.214 (the W-CDMA standard), and (4) the documents offered by a consortium named "3rd Generation Partnership Project 2" (3GPP2) and embodied in a set of documents including Document Nos. C.S0002-A, C.S0005-A, C.S0010-A, C.S0011-A. C.S0024, C.S0026, C.P9011, and C.P9012 (the cdma2000 standard). In the case of the 3GPP and 3GPP2 documents, these are converted by standards bodies worldwide (e.g., TIA, ETSI, ARIB, TTA, and CWTS) into regional standards and have been converted into international standards by the International Telecommunications Union (ITU). These standards are incorporated herein by reference.

Although the various aspects of the present invention are described in the context of a CDMA communications system, those skilled in the art will appreciate that the techniques for acquiring a gated pilot signal described herein are likewise suitable for use in various other communications environments such as a GSM and TDMA communications systems. Accordingly, any reference to a CDMA communications system is intended only to illustrate the inventive aspects of the present invention, with the understanding that such inventive aspects have a wide range of applications.

The communications system 100 provides a mechanism for a subscriber station 102 to access a network, or communicate with other subscriber stations, through one or more base stations. For ease of explanation, only three base stations 104, 106 and 108 are shown. However, as a matter of practice, numerous base stations will be operating with at least one base station located in every cell. Should the cells be divided into sectors, a base station would be located in each sector. In the described exemplary embodiment, each base station 104, 106 and 108 transmits a gated pilot signal 110, 112 and 114, respectively. The gated pilot signal is used by the subscriber station 102 for initial synchronization with a base station and to provide coherent demodulation of the transmitted signal once the subscriber station is synchronized to one of the base stations.

The gated pilot signal contains no data and is generally characterized as an unmodulated spread spectrum signal. The PN code used to spread each gated pilot signal 110, 112 and 114 should, therefore, be different to allow the subscriber station 102 to distinguish between the three base stations 104, 106 and 108. The PN code used to spread each gated pilot signal is known, a priori, by the subscriber station 102, and therefore, each gated pilot signal 110, 112 and 114 can be despread at the subscriber station through a correlation process with a locally generated PN code. A communications channel can then be established with the base station having the strongest gated pilot signal. Given relatively constant environmental conditions, the strongest gated pilot signal is generally transmitted from the base station in the closest proximity to the receiving subscriber station 102, in this case the base station 106.

In an exemplary embodiment of a communications system 100, acquisition of a gated pilot signal can be achieved by employing a searching methodology that exploits certain characteristics of the gated pilot signal. Pilot search operation consists of correlating the incoming signal with pre-stored Pilot PN sequences and looking for strong correlation peaks. Once a strong peak is found to be in a coset, the subscriber station zooms in on the PN position of the pilot peak to confirm the presence of the pilot. After pilot presence is confirmed the subscriber station tries to achieve frequency lock with the base station that is transmitting the peak. After the frequency lock is achieved, the subscriber station demodulates a control channel to get the timing information about the base station transmitting the pilot. The subscriber station then adjusts its own timing to synchronize itself with the base station.

Although not limited in applicability, the searching methodology is particularly adaptable to CDMA communications systems. In CDMA communications systems, the gated pilot signal transmitted by each base station generally has the same PN code but with a different phase offset. The use of the same PN code is advantageous because it allows a subscriber station to access a base station with a search through a single PN code sequence for all phase offsets. The phase offset allows the gated pilot signals for each base station to be distinguished from one another.

The gated pilot signal transmitted by each base station is contained in a pilot channel of a forward link waveform. The forward link refers to transmissions from a base station to a subscriber station. The forward link waveform may take on various forms without departing from the inventive concepts described throughout. By way of example, the very nature of a gated pilot signal implies that the forward link channel structure, in its simplest form, includes at least one channel which is time-division multiplexed with the pilot channel. In the described exemplary embodiment, the pilot channel is time-division multiplexed with a traffic channel. The resulting forward link waveform is spread with a PN code, modulated onto a carrier waveform, amplified and transmitted into its respective cell or sector by a base station.

More complex forward link channel structures are also contemplated. By way of example, the traffic channel can be parsed into multiple code channels by spreading each traffic channel with an inner orthogonal code generated by using Walsh functions. Alternatively, the pilot channel can be spread with a Walsh cover, and additional code and time channels can be added to include a synchronization channel, paging channels, and traffic channels.

Figure 3:
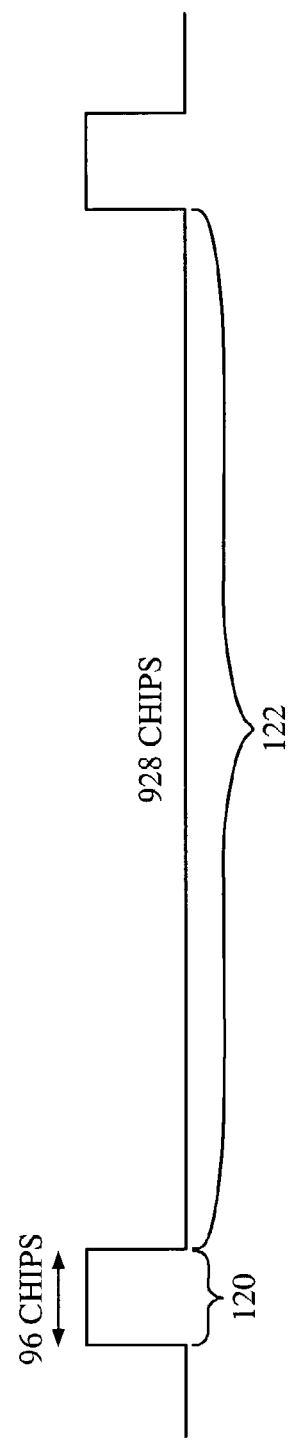
FIG. 3 shows an exemplary gated pilot signal.

In an exemplary embodiment, the communication system 100 has a gated pilot signal with a period of 1024 chips. The gated pilot signal includes a period of transmission for 96 chips followed by a period of no transmission for 928 chips as shown in FIG. 3.

In CDMA based communication systems, the base stations are separated in PN space by integer multiples of a PN increment where one PN increment is 64 PN chips. IS-856 specifies a minimum PN separation between two base station PN offsets to be one PN increment, i.e., 64 chips.

In CDMA communication systems, the PN code is periodic and typically chosen to be $2^{15}$ (32,768) chips per period with 512 PN phase offsets spaced apart by 64 chips. Thus, the PN space comprises $2^{15}$ (32,768) possible PN positions, which results in a total of 512 (215/64) distinct PN phase offsets possible for a base station. As the gated pilot period is 1024 chips in an exemplary embodiment, a PN circle has a total of 32 pilot bursts (215/1024). Thus, the pilot signal is spread by the PN code and transmitted in 32 pilot signal bursts per period.

Figure 4:
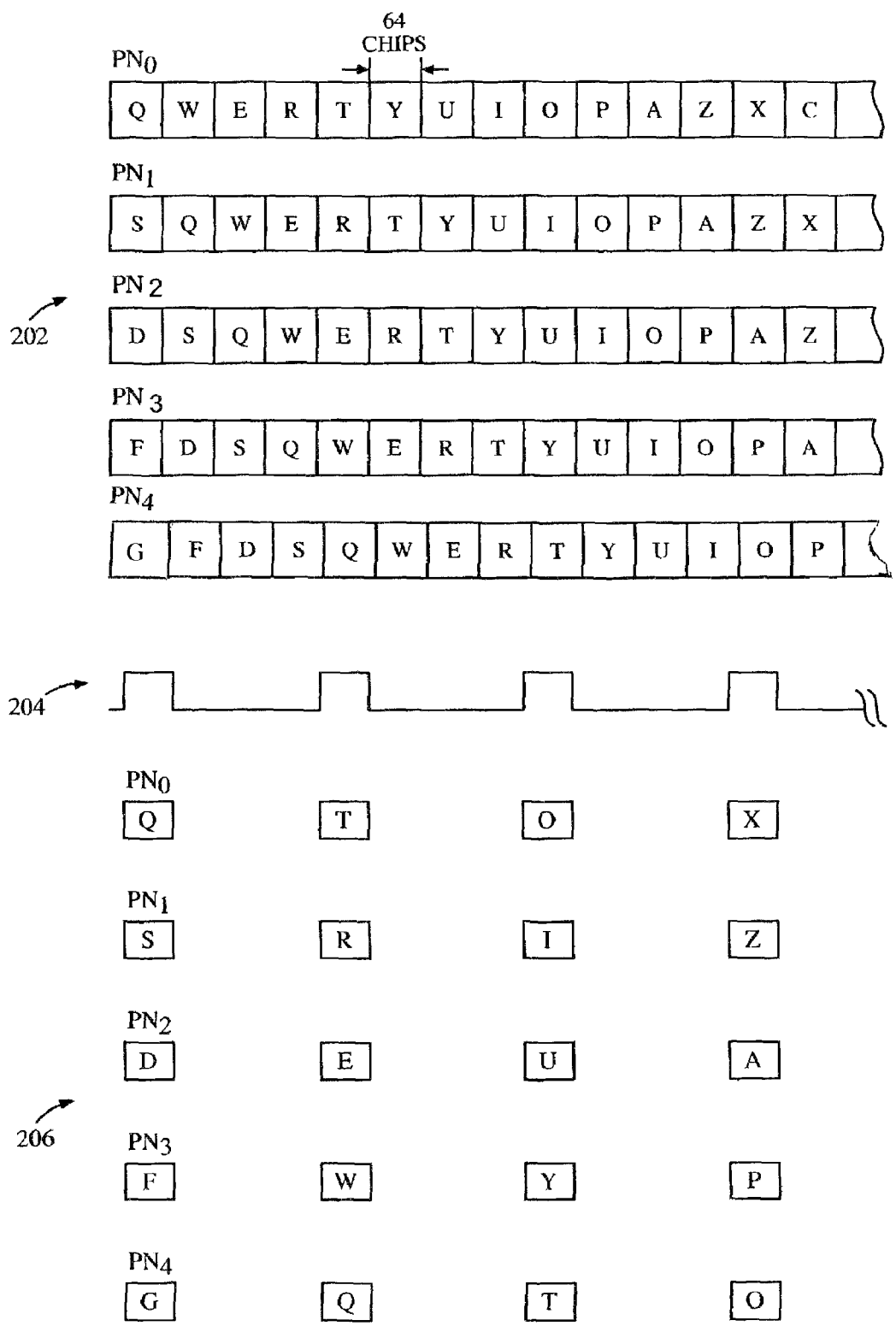
FIG. 4 is a timing diagram showing PN code sequences for several exemplary base stations operating in a CDMA communications system.

A continuous pilot signal is a repeating series of symbols as shown by "PN 0," "PN 1," "PN 2," "PN 3," and "PN 4" in FIG. 4. FIG. 4 is a timing diagram for an exemplary communications system showing five PN codes 202 each being 32,768 chips long. For ease of explanation, the term "symbol" will be used as a shorthand convention for identifying a 64-chip PN code sequence with the understanding that the gated pilot signal contains no data. Using this convention, the 32,768-chip PN code can be represented by a 512 symbol sequence.

In the following example, a system having only 64 distinct PN phase offsets is assumed. Each PN code includes the same symbol sequence but offset in phase. By way of example, PN0 is offset by one symbol from PN1. Similarly, PN1 is offset by one symbol from PN2, PN2 is offset by one symbol from PN3, and PN3 is offset by one symbol from PN4. Neighboring base stations would transmit the same pilot signal, but starting at a different offset in the sequence, as shown by "PN 1" through "PN 4". Since there are 64 symbols in this example, there would be a maximum of 64 distinct PN offsets, 0 through 63.

Each PN code is used to spread a pilot signal. A gating function 204 is then applied to each spread spectrum pilot signal 202. For purposes of illustration, the gating function will be defined as a gate having a one-symbol width and a four-symbol period. As a result of this gating function 204, four different symbol sequences 206 are generated PN 0, PN1, PN 2, and PN 3. The same symbol sequence is generated every fourth PN code phase offset as shown by PN0 and PN4. All gated pilot signals having the same symbol sequence, regardless of phase shift, can be grouped together into sets known as a coset as follows:

Coset0: PN 0, PN4, PN 8, . . . PN 508
Coset1: PN1, PN 3, PN 9, . . . , PN 509
Coset2: PN 2, PN6, PN 10, . . . PN 510
Coset3: PN 3, PN7, PN11, . . . PN 511 where the number of cosets can be defined as the number of PN code phase offsets divided by the number of pilot signal bursts per period. Coset is defined as the set of pilot offsets which share the same set of symbols, shifted in time. When searching for the pilot signal bursts from one coset, the pilot signal bursts from the other cosets will not be seen.

In other communications systems, the length of the PN code for spreading the pilot signal may vary depending on a variety of factors. A short PN code facilitates faster acquisition time whereas a long PN code increases code processing gain. Those skilled in the art will be readily able to assess the performance tradeoffs to determine the optimal length for the PN code. In addition, the number of phase offsets, spacings, and pilot bursts per period can be varied to optimize system parameters.

In an exemplary embodiment, pilots, which are separated by multiples of the gated pilot period, such as every 16 (1024/64) PN offsets, will appear to have identical pilot bursts, although shifted in time. Table 1 shows all the possible 512 PN offsets divided into 16 different cosets.

TABLE 1

| PN offsets divided into Cosets | |
| --- | --- |
| Coset # | PN Offsets |
| Coset0 | 0, 16, 32, 48, 64, . . . 496 |
| Coset1 | 1, 17, 33, 49, 65, . . . 497 |
| Coset2 | 2, 18, 34, 50, 66, . . . 498 |
| Coset3 | 3, 19, 35, 51, 67, . . . 499 |
| . . . | . . . |
| Coset15 | 15, 31, 47, 63, 79, . . . 523 |

To have a larger separation in the PN space for adjacent base stations, it is likely that the network operators would prefer using higher PN increments to lower PN increments. Some CDMA network operators that prefer using a PN increment of four for most networks may occasionally switch to a PN increment of two or one for densely populated networks. Thus, searching cosets in decreasing order of PN increment may result in a reduction in acquisition time.

In an exemplary embodiment, four cosets are gathered into one group, thus dividing the 16 cosets as shown in Table 1 into four different coset groups as shown in Table 2, where for CN, N is a variable that denotes the coset number.

TABLE 2

| Coset Groups | |
| --- | --- |
| Coset Group 0 | C0, C4, C8, C12 |
| Coset Group 1 | C2, C6, C10, C14 |
| Coset Group 2 | C3, C7, C11, C15 |
| Coset Group 3 | C1, C5, C9, C13 |

Coset Group 0 (CG0) contains offsets for PN increments which are an integer multiple of four. CG1 contains offsets for PN increments which are an integer multiples of two excluding entries from CG0. CG2 and CG3 contain the remaining odd PN offsets. To enhance the probability of early detection of the pilot signal, a subscriber station can search the cosets in the order CG0, CG1, CG2 and CG3.

There are many occasions where a subscriber station looses a pilot signal and has to re-acquire the pilot by going through pilot re-acquisition. A system loss exception occurs when a subscriber station loses the pilot signal. IS-856 pilot search operation includes searching an entire PN sequence for each of the 16 cosets sequentially, which makes the IS-856 pilot searching operation at least 16 times more time consuming than CDMA pilot search operation of a continuous CDMA pilot signal.

Once pilot search has found the pilot signal, then the subscriber station goes through a series of timing synchronization procedures to align the subscriber station's timing and frequency with the base station. Once the timing synchronization is achieved, the subscriber station declares a successful acquisition and enters steady state operation. In the steady state operation, the subscriber station continually tracks the pilot by searching it periodically. Pilot acquisition searches take an order of magnitude longer than the periodic tracking searches performed in the steady state.

During steady state operation of the subscriber station, the subscriber station continually tracks the PN phase of the pilot signal in order to coherently demodulate the associated data channels and maintain the system timing. There are many occasions that could result in the subscriber station losing the system timing and declaring system loss. A common reason for system loss is not being able to track a pilot for an extended period of time.

Another reason for system loss is due to pilot fade. If the subscriber station is moving away from coverage then the pilot signal slowly fades into noise. In an IS-856 embodiment, if the pilot signal is not found for a certain period of time, then the various supervision timers defined in IS-856 protocol expire, which causes the subscriber station to generate system loss. Pilot fade is also possible due to temporary loss of pilot signal when the subscriber station enters an elevator or tunnel.

One of the less common occurrences of system loss is diagnosis of a fault in the subscriber station. When encountered with a problem that prohibits normal operation of the subscriber station, the subscriber station diagnostic software typically pauses the software to work around or fix the fault. This results in losing the timing synchronization with the base station resulting in system loss.

System losses are very common in subscriber stations that perform CDMA+IS-856 hybrid operation sharing a single RF chain in time-multiplexed fashion. The reason is that these hybrid devices give higher priority to delay sensitive CDMA operation than delay tolerant IS-856 operation. Hence any prolonged CDMA activity results in IS-856 operation not being able to track the pilot signal, which results in system loss followed by system re-acquisition. Examples of a few such CDMA activities are given below.

Mobile Registration on a CDMA network
    Voice page reception or voice call origination from a CDMA network
    Short messaging service activity with CDMA network
    Position location session using CDMA pilot signals The above mentioned hybrid mode activities can occur often depending upon the way the hybrid subscriber station is being used by the user. Every time such system loss occurs IS-856 operation could spend a long time re-acquiring the base station.

In an embodiment, the subscriber station enters a pilot acquisition state and begins the process of acquiring the pilot signal by searching cosets after declaring a system loss exception. This is called a re-acquisition of the pilot signal since the subscriber station had already acquired and lost the pilot signal. As the AT had already acquired a pilot before and had synchronized its timing to a base station, the time it takes to re-acquire the pilot signal can be reduced using the knowledge of the last known PN offset.

Figure 5:
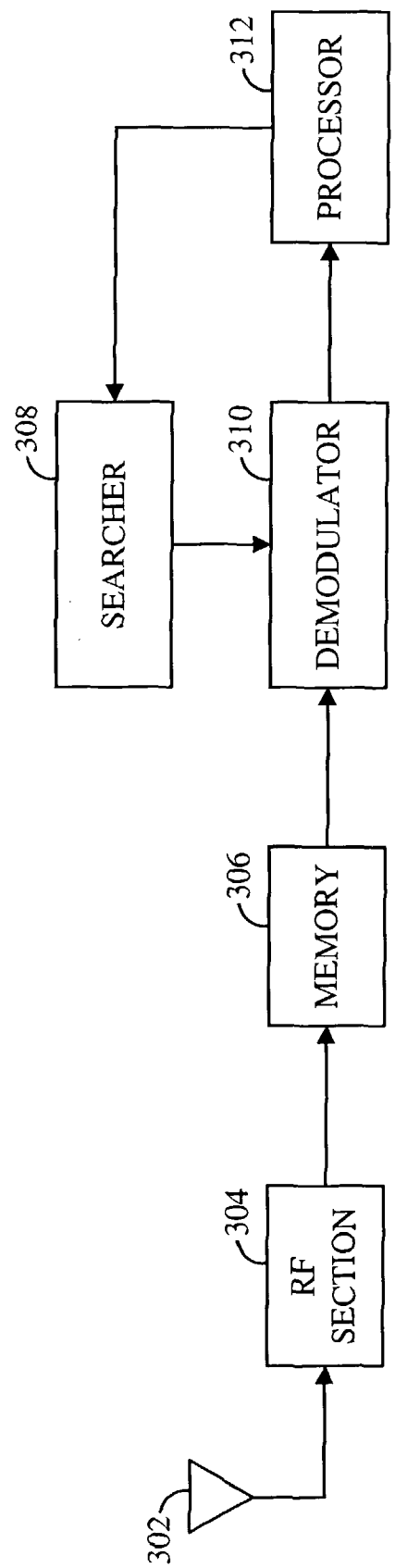
FIG. 5 is a block diagram of an exemplary receiver in a CDMA communications system.

FIG. 5 is a block diagram of an exemplary receiver in a subscriber station operating in a CDMA communications system. In the described exemplary embodiment, the signal transmissions from all the base stations are received through one or more antennas 302. The resulting superimposed signal received by the antenna 302 is provided to an RF section 304.

The RF section 304 filters and amplifies the signal, downconverts the signal to baseband, and digitizes the baseband signal. The digital samples are provided to memory 306 for the purposes of acquisition. The memory 306 stores the number of chips equal to or greater than the period of the pilot signal burst. This approach should result in at least one gated pilot burst from each base station being captured in memory 306. An HDR communications system with 32 pilot signal bursts over a PN code sequence of 32,768 chips has a pilot signal burst period equal to 1024 chips.

The acquisition process involves searching through the digital samples stored in memory to find all the pilot signal bursts for one coset. This can be achieved by correlating the digital samples stored in memory with a locally generated PN code sequence. By way of example, a searcher 308 generates a symbol, i.e., a 64 chip PN code sequence, common to the gated pilot signals from each base station in the same coset. The symbol from the searcher 308 is coupled to a demodulator 310 where it is correlated with the digital samples stored in memory 306. The searcher 308 sequentially shifts the symbol in phase as part of a systematic search through the digital samples to find a corresponding symbol in memory 306.

The demodulator 310 can be implemented in a variety of fashions. By way of example, in CDMA communications systems, or any other type of communications system, which uses diversity techniques to combat fading, a RAKE receiver may be used. The RAKE receiver in a CDMA communications system typically utilizes independent fading of resolvable multipaths to achieve diversity gain. Specifically, the RAKE receiver can be configured to process one or more multipaths of the gated pilot signal. Each multipath signal is fed into a separate finger processor to perform PN code despreading with the locally generated PN code from the searcher 308. Walsh code decovering may also be provided by the RAKE receiver if needed. The RAKE receiver then combines the output from each finger processor to recover the gated pilot signal.

The output of the demodulator 310 is provided to a processor 312. The processor 312 is coupled to the searcher 308 and implements an acquisition algorithm to select the base station having the strongest pilot signal.

Figure 6:
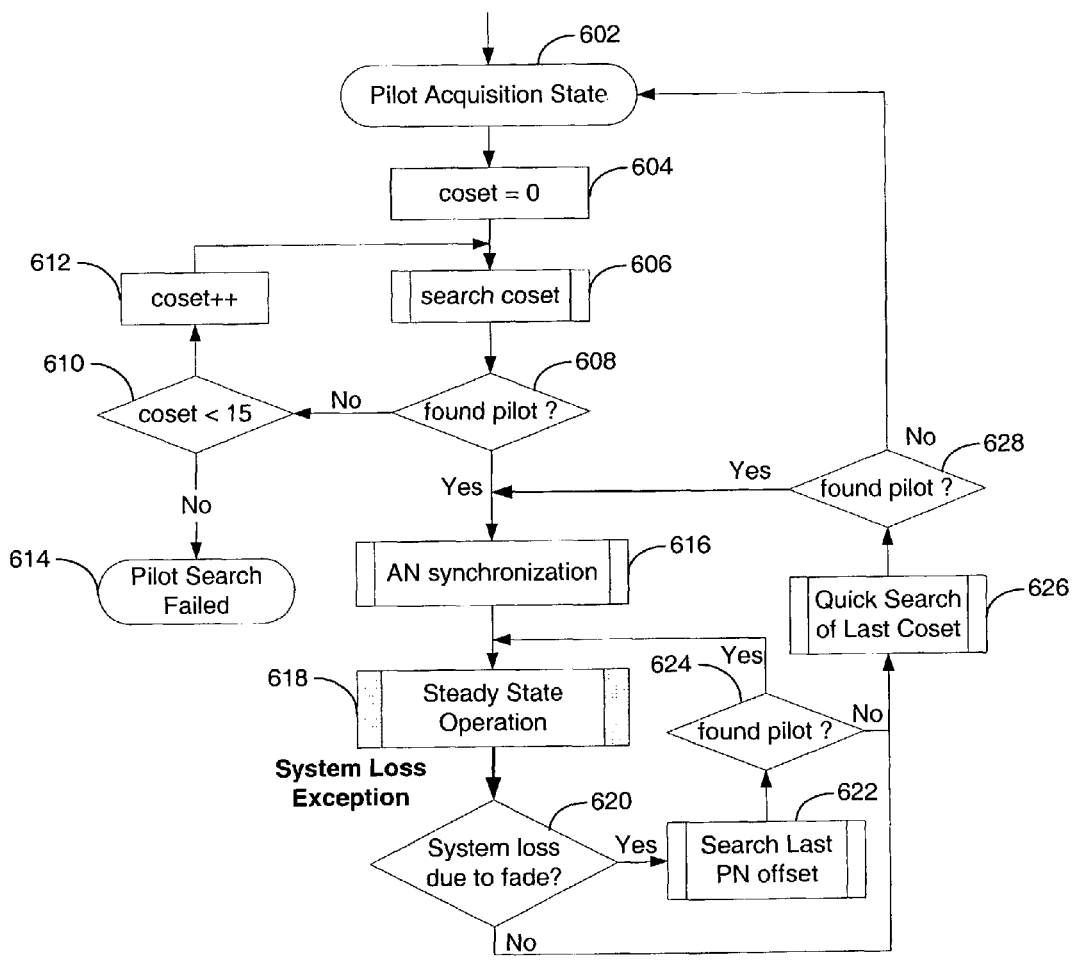
FIG. 6 is a flow chart illustrating an exemplary algorithm performed by a processor in a CDMA receiver.

An acquisition algorithm implemented by the processor in accordance with an embodiment is illustrated by the flow chart of FIG. 6. In step 602, the processor enters a pilot acquisition state. In step 604, a variable coset representing a coset group is initialized to zero. In step 606, the processor searches coset group n, where the value n is an integer.

In step 608, a check is made to determine whether the pilot was found in the current coset n. If the pilot was found, then in step 616, the subscriber station is synchronized with the base station of the found pilot. Otherwise, the flow of control proceeds to step 610.

In step 610, a check is made to determine whether all of the cosets have been searched. In the embodiment of FIG. 6, the number of cosets searched is 16. It would be apparent to those skilled in the art that other embodiments may have a different number of cosets to search. If all of the cosets have been searched, then the flow of control proceeds to step 614. In step 614, the pilot search has failed is indicated. If not all of the cosets have been searched, then the flow of control proceeds to step 612. In step 612, the coset n is incremented, which means that the next coset shall be searched and the flow of control proceeds to step 606.

After the subscriber station is synchronized with the base station of the found pilot in step 616, the flow of control proceeds to step 618 and the subscriber station is in steady state operation.

When there is a system loss exception, the flow of control proceeds to step 620. In step 620, a check is made to determine whether the system loss was due to fading. If the system loss is due to fading, then the flow of control proceeds to step 622, otherwise the flow of control proceeds to step 626.

In step 622, the subscriber station searches the last PN offset. The subscriber station searches the last known pilot offset using a small search window on the PN sequence. If the pilot was found successfully, then the subscriber station's timing is intact and the subscriber station does not need to go through a complete coset search. Thus, re-acquisition is achieved in a smaller time span than required for a complete system acquisition and the flow of control proceeds to step 618.

If no pilot was found during the small window search around the last known PN offset, then it could be due to the pilot slipping too far due to lack of tracking. The flow of control proceeds to step 626. In step 626 a quick search of the last coset is performed. The coset in which the last pilot was found is searched. The subscriber station performs an entire PN sequence search within the last coset looking for the last known PN offset. The flow of control proceeds to step 628.

In step 628, a check is made to determine whether the pilot was found. If the pilot was found, then the flow of control proceeds to step 616 and the subscriber station is synchronized with the base station of the found pilot. If the pilot was not found, then the flow of control proceeds to step 602.

If the pilot was not found in both the above quick searches, then the subscriber station can enter the pilot acquisition state to perform pilot search of all cosets. The overhead for the two quick searches is only a fraction of the total time needed for complete system acquisition. Thus, re-acquisition utilizing the two quick searches speeds up the acquisition process.

Although the exemplary processor algorithm described in connection with FIG. 6 includes various sequential steps, those skilled in the art will appreciate that the sequence of steps may be altered to optimize processor resources, or alternatively, one or more steps may be processed in parallel. Moreover, one or more steps could be omitted, or additional steps known in the art could be used, either alone or in combination with one or more of the described algorithmic steps set forth in FIG. 6.

It would be apparent to those skilled in the art that embodiments may include one or both of the re-acquisition search techniques shown in FIG. 6. In an embodiment, a gated pilot signal can be re-acquired faster by searching a last known pilot offset. In an embodiment, a gated pilot signal can be re-acquired faster by searching a last coset in which the last pilot signal was found.

Those skilled in the art will appreciate that the various illustrative logical blocks, modules, circuits, and algorithms described in connection with the embodiments disclosed herein may be implemented as electronic hardware, computer software, or combinations of both. To clearly illustrate this interchangeability of hardware and software, various illustrative components, blocks, modules, circuits, and algorithms have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of re-acquiring a gated pilot signal in a communication device, comprising:
   receiving the gated pilot signal in the communication device;
   identifying digital samples corresponding to a coset when acquiring the gated pilot signal;
   determining the gated pilot signal is lost;
   searching within a search window including a last known pilot PN offset in the coset; and
   searching, if the gated pilot signal is not found within the search window, the coset when reacquiring the gated pilot signal.

2. The method of claim 1, further comprising entering steady state operation if the gated pilot signal is found at the last known pilot PN offset.

3. The method of claim 1, further comprising searching a last coset in which the last pilot signal was found.

4. The method of claim 3, wherein searching a last coset in which the last pilot signal was found involves performing an entire PN sequence search within the last coset.

5. The method of claim 4, further comprising entering steady state operation if the gated pilot signal is found in the last coset in which the last pilot signal was found.

6. The method of claim 4, further comprising searching other cosets if the gated pilot signal is not found in the last coset in which the last pilot signal was found.

7. A receiver, comprising:
- a searcher configured to search for a plurality of gated pilot signals;
- a processor coupled to the searcher and configured to select, from the plurality of gated pilot signals, a gated pilot signal corresponding to the last known pilot PN offset in a coset; and
- a demodulator configured to identify digital samples corresponding to the coset when acquiring the gated pilot signal;
- wherein the searcher is further configured to search the coset when reacquiring the gated pilot signal.

8. The receiver of claim 7, wherein each of the plurality of gated pilot signals are transmitted from one of a plurality of base stations.

9. The receiver of claim 7, wherein the searcher is configured to search within a search window including the last known PN offset.

10. The receiver of claim 9, wherein the searcher is configured to search, if the gated pilot is not found within the search window, a last known coset including the gated pilot signal.

11. A receiver, comprising:
- a searcher means for searching for a plurality of gated pilot signals;
- a processing means coupled to the searcher for selecting, from the plurality of gated pilot signals, a gated pilot signal corresponding to the last known pilot PN offset in a coset; and
- a demodulator means for identifying digital samples corresponding to the coset when acquiring the gated pilot signal;
- wherein the searcher means is configured to search the coset when reacquiring the gated pilot signal.

12. The receiver of claim 11, wherein each of the plurality of gated pilot signals are transmitted from one of a plurality of base stations.

13. The receiver of claim 11, wherein the searcher means comprises a window searching means for searching within a search window including the last known PN offset.

14. The receiver of claim 13, wherein the searcher means comprises coset searching means for searching, if the gated pilot is not found within the search window, a last known coset including the gated pilot signal.

15. A computer-readable medium embodying a program of instructions executable by a computer to perform a method of acquiring a gated pilot signal, the method comprising:
- identifying digital samples corresponding to a coset when acquiring the gated pilot signal;
- determining the gated pilot signal is lost;
- searching within a search window including a last known pilot PN offset in the coset; and
- searching, if the gated pilot signal is not found within the search window, the coset when reacquiring the gated pilot signal.

16. The computer-readable medium of claim 15, the method further comprising entering steady state operation if the gated pilot signal is found at the last known pilot PN offset.

17. The computer-readable medium of claim 15, the method further comprising searching a last coset in which the last pilot signal was found.

18. The computer-readable medium of claim 17, wherein searching a last coset in which the last pilot signal was found involves performing an entire PN sequence search within the last coset.

19. The computer-readable medium of claim 18, the method further comprising entering steady state operation if the gated pilot signal is found in the last coset in which the last pilot signal was found.

20. The computer-readable medium of claim 19, the method further comprising searching other cosets if the gated pilot signal is not found in the last coset in which the last pilot signal was found.

21. A receiver, comprising:
- a radio frequency (RF) section configured to receive a plurality of gated pilot signals transmitted from a plurality of base stations and to generate a plurality of digital samples corresponding to the plurality of gated pilot signals;
- a searcher configured to generate a symbol and to phase shift the symbol to generate a first plurality of phase shifted symbols when acquiring a gated pilot signal and to phase shift the symbol within a search window including a last known PN offset to generate a second plurality of phase shifted symbols when reacquiring the gated pilot signal;
- a processor coupled to the searcher and configured to select a gated pilot signal from the plurality of gated pilot signals based on the first plurality of phase shifted symbols and to reacquire the gated pilot signal after determining the gated pilot signals has been lost by selecting the gated pilot signal based on the second plurality of phase shifted symbols; and
- a demodulator configured to correlate each of the first plurality phase shifted symbols with digital samples corresponding to the plurality of gated pilot signals to identify digital samples corresponding to a coset when acquiring the gated pilot signal,
- wherein the searcher is further configured to search the coset when reacquiring the gated pilot signal and the gated pilot signal is not within the search window, and the processor is further configured to determine if the pilot signal is contained within the coset.

* * * * *